United States Patent Office 3,422,148
Patented Jan. 14, 1969

1

3,422,148
PROCESS FOR THE CONTINUOUS MANUFACTURE OF METHYL ISOPROPENYL KETONE IN THE LIQUID PHASE
Johannes Wöllner, Kapellen, Kreis Moers, and Friedrich Engelhardt, Homberg (Lower Rhine), Germany, assignors to Rheinpreussen Aktiengesellschaft fur Bergbau und Chemie, Homberg (Lower Rhine), Germany, a corporation of Germany
No Drawing. Filed Feb. 26, 1964, Ser. No. 347,997
Claims priority, application Germany, Mar. 2, 1963, R 34,583
U.S. Cl. 260—593     9 Claims
Int. Cl. C07c 45/00; C07c 49/20

ABSTRACT OF THE DISCLOSURE

Single stage process for producing methyl isopropenyl ketone from methyl ethyl ketone by liquid phase contact of methyl ethyl ketone with aqueous formaldehyde in the presence of an acid cation exchanger, optionally using a fixed bed or suspension catalyst system and concomitantly a batch or continuous technique, e.g., at temperatures between about 50–180° C. and pressures between about 0.5–20 atmospheres excess pressure.

---

The present invention relates to a process for the single stage manufacture of methyl isopropenyl ketone, and more particularly to the production of methyl isopropenyl ketone by contacting methyl ethyl ketone with formaldehyde in liquid phase.

While methyl vinyl ketone is today best manufactured by adding water onto vinyl acetylene, there has been no corresponding process for the manufacture of the homologous methyl isopropenyl ketone.

The manufacture of methyl isopropenyl ketone in the liquid phase has been performed hitherto in two steps, methyl ethyl ketone being condensed with formaldehyde in the first step to produce 2-methyl-butanol-(1)-one-(3), and the keto alcohol being dehydrated in a second step to produce methyl isopropenyl ketone.

It is also known in the prior art to transpose methyl ethyl ketone, formaldehyde and an appropriate amine to produce the corresponding Mannich compound, and to cleave the latter thermally in a second step, into methyl isopropenyl ketone and amine.

The process of U.S. Patent 2,510,914 is also a two-step process. In this case, the methylol compound obtained by the basically catalyzed condensation of methyl ethyl ketone with formaldehyde is dehydrated in a second step by strong acids to the unsaturated ketone.

The process of Swedish Patent 102,692 is performed in the vapor phase, methyl ethyl ketone and 30% formaldehyde being passed over silica gel at 280–300° C., while according to the information in French Patent 874,411, lead salts are used as vapor phase catalysts.

The above-mentioned known processes are either two-step processes in which basic catalysts are used, which of course have to be neutralized with acids after the condensation has been performed, or else they are vapor-phase processes with relatively low space-time yields, since the formation of by-products is greatly favored due to the high condensation temperatures required.

It is an object of the present invention to overcome the foregoing drawbacks and to provide a convenient, inexpensive, and versatile process for the single-stage production of methyl isopropenyl ketone leading to good space-time yields.

It is another object of the present invention to provide a process of the foregoing type utilizing an acid cation exchanger under process conditions at which no resinification nor inactivation of the cation exchanger takes place.

It is still another object of the present invention to provide a process of the foregoing type in which methyl isopropenyl ketone is produced directly without appreciable formation of by-products in spite of the use of a multiple component system for carrying out the reaction.

It is another object of the present invention to provide a process of the foregoing type in which water may comprise the liquid phase with the formaldehyde and methyl ethyl ketone without unfavorable influence on the reaction by the water content present and without the formation of inorganic components in the reaction product.

It is another object of the present invention to provide such a process as hereinabove described so as to obtain a reaction product requiring no subsequent work up which might otherwise be necessary to remove inorganic components formed during the reaction.

It is a further object of the present invention to provide a process which may be carried out either batch-wise or continuously.

It is a particular object of the present invention to utilize a strongly acid cation exchange resin which possesses good temperature resistance as the cation exchange component.

Other and further objects of the present invention will become apparent from a study of the within specification and accompanying examples.

It has been found in accordance with the present invention that a versatile single-stage process for the production of methyl isopropenyl ketone may be provided which comprises contacting methyl ethyl ketone with formaldehyde in liquid phase in the presence of an acid cation exchanger, whereupon the methyl isopropenyl ketone-containing reaction mixture may be recovered, and in turn the methyl isopropenyl ketone itself as desired. The methyl isopropenyl ketone is recovered preferably from the reaction mixture by distillation, and usually this takes place after the reaction mixture has been separated from the acid cation exchanger.

It will be appreciated that the instant process may be carried out batch-wise or continuously and is usually effected at an elevated temperature such as a temperature between about 50–180° C. Elevated pressure may also be employed, such as a pressure between about 0.5–20 atmospheres excess pressure, i.e. gage pressure.

The molar ratio of the starting methyl ethyl ketone to the formaldehyde is preferably between about 1–10:1. The formaldehyde may be present as an aqueous solution, such as in the form of an aqueous solution having a formaldehyde concentration between about 1–50% by weight, and preferably 25–40% by weight.

The cation exchanger is significantly a resin which contains acid groups and is generally selected from the group consisting of copolymers of monofunctional polymerizable compounds, and difunctional or polyfunctional polymerizable compounds having more than two functional groups, phenolic condensation resins which are obtained from phenols and/or their substitution products and aldehydes and/or ketones.

Since methyl isopropenyl ketone is highly reactive and unstable, it is surprising that, at the reaction temperatures used in the one-step continuous liquid phase process of passing a mixture of methyl ethyl ketone and aqueous formaldehyde over the acid cation exchanger in accordance with the present invention, no resinification and hence no inactivation of the cation exchanger used as the condensing agent occurs.

Furthermore, it could not be foreseen that the reaction would not be unfavorably influenced by the water content in the liquid phase reaction mixture used. A special advantage of the process of the invention consists in the fact that, in the course of the reaction, no inorganic components, such as basic substances or salts, develop in the reaction product, and hence no later neutralization or removal of such substances or salts is required. Thus, for example, the catalytic hydrogenation of the methyl isopropenyl ketone product produced by the process of the invention to methyl isopropyl ketone in the liquid phase over palladium catalysts is not in the least disturbed due to the complete absence of such substances and salts, whereas in the presence of even minute amounts of such substances and salts, the activity of the noble metal catalyst is quickly lost. This comparison test establishes clearly the absence of even minute amounts of such basic substances and salts in accordance with the instant process.

Polymerization-type or condensation-type resins containing, for example, sulfonic acid groups and/or carboxyl groups, or phosphonic acid groups or arsonic acid groups, are generally suitable as acid cation exchangers in accordance with the invention. Polymerization-type cation exchangers include copolymers of monofunctional polymerizable compounds, such as styrene, o-, m- and p-methyl- and -ethyl-styrene, vinyl naphthalene, acrylic acid or methacrylic acid, and difunctional or polyfunctional compounds, such as divinyl benzene, divinyl sulfone, ethylene dimethacrylate, divinyl ketone, vinyl maleate, vinyl esters of acrylic acid, methacrylic acid, ethacrylic acid, divinyl esters of dibasic acids such as oxalic acid, maleic acid, etc. Suitable condensation-type cation exchangers, on the other hand, include phenolic resins which are obtained from phenols and/or their substitution products and aldehydes and/or ketones. The manufacture of the cation exchange resins, which does not form an object of the present application, has been described in U.S. Patents Nos. 2,597,438, 2,500,149 and 2,366,007 and the German Patents Nos. 960,858, 965,166, 1,031,513, 1,057,338, 755,119, 734,279, 749,553, 733,679, 747,644, 871,964, 914,186 and 919,666. The cation exchanger resins are commercially available in the form of their alkali salts. These products can be converted to the acid form by treating the resin with a mineral acid, such as hydrochloric acid, and subsequently removing the excess mineral acid and the inorganic salt by washing with water.

It has proven particularly advantageous furthermore to use for the process of the invention strongly acid cation exchangers having good temperature resistance. Such temperature-resistant cation exchangers include polystyrene-divinyl benzene resins containing sulfonic acid groups, such as Dowex 50–X8 of the Dow Chemical Company, Midland, Michigan, U.S.A.; Amberlite IR 112 and 120 of the Rohm & Haas Company, Philadelphia, Pa., U.S.A.; Permutit RS of the Permutit A.G., Berlin-Schmargendorf, West-Berlin; Duolite C 25 of the Chemical Process Company, Redwood City, Calif., U.S.A.; and phenolic resins containing sulfonic acid groups, such as Duolite C 3 of the Chemical Process Company, Redwood City, Calif., U.S.A.; Lewatit PN and KSN of the Farbenfabriken Bayer, Leverkusen, Federal Republic of Germany, and Wofatit F, P and D of the VEB Farbenfabriken Wolfen, Eastern Germany.

The process of the invention as mentioned above can be performed both batch-wise and continuously. The solid or fixed bed embodiment or the suspension method with respect to the exchange resin can be used for the continuous process advantageously. For batch operation, it is preferable to use the suspension method.

The quantity of the cation exchanger to be used in accordance with the single-step process of the present invention has no maximum limit. In the suspension embodiment, the quantity of cation exchanger may amount, for example, to 0.5 to 100 parts by volume, and preferably 20 to 50 parts by volume per 100 volume parts of the liquid reactants used i.e. 0.005–1 part by volume per part by volume of liquid phase reactants present.

When using fixed-bed catalyst, 0.1 to 20 volumes, preferably 3 to 10 volumes of the liquid reactants per volume cation exchange resin per hour are passed through the reactor. The through-put of reactants will depend on the reaction temperature and will increase with increasing temperature. For example, at a reaction temperature of 110° C., the volume of reactants passed through the reactor, will be 3 to 4 liters per hour per liter of cation exchange resin; at 130° C., 6–7 liters per hour per liter of cation exchange resin; and at 145° C., 8–10 liters per hour per liter of cation exchange resin.

The molar ratio of methyl ethyl ketone to formaldehyde is to be weighted in favor of the methyl ethyl ketone; expediently such ratio should be from 1:1 to 10:1, preferably 6:1 to 8:1.

The temperatures used in the process of the invention may generally range between about 50 and 180° C., and preferably should range between about 80 to 130° C.

The pressure is governed, of course, by the composition of the reaction mixture and the temperature. In the temperature range from 50 to 180° C., and for the methyl ethyl ketone:formaldehyde ratios from 1:1 to 10:1, the pressure may amount to, for example, 0.5 to 20 atmospheres excess pressure.

The throughput of the reaction mixture can vary within wide limits, and is governed generally by the reaction temperatures used.

The isolation of the methyl isopropenyl ketone from the reaction mixture may be performed advantageously by the known process of fractionation in a selective distillation column, this process being expediently performed at reduced pressure.

The following examples are set forth for the purpose of illustration and not limitation:

Example 1

A reaction tube of stainless steel (V4A) 1250 mm. long and 24 mm. nominal diameter, with a wall thickness of 2 mm., equipped with a steam jacket for 2.5 atmospheres excess pressure of steam, a temperature measuring device and a manometer, is filled with 560 cc. of an acid cation exchanger on the basis of a sulfonated styrene-divinyl benzene polymer, such as Dowex 50–X–8 of Dow Chemical Corporation, Midland, Mich., U.S.A. A proportioning pump forces a mixture of methyl ethyl ketone and 30% aqueous formaldehyde solution in a molar ratio of 6:1, preheated to 130° C., through the reaction tube heated with 2.5-atm. (gage) steam, at a throughput of 3.6 liters per hour. A pressure of about 15 atmospheres excess pressure thereupon develops in the tube. After passing through the reaction tube, the reaction product is removed and decompressed. The reaction product is fed through an intensive cooler to condense the vapors and cool it. The liquid, which in the meantime has become heterogeneous, now passes into a continuously operating separator, where the two liquid layers thereof are separated.

To determine the yield of methyl isopropenyl ketone, the reaction product obtained in one hour at constant conditions of reaction (temp. 130° C., throughput 3.6 liters) is tested in the following manner:

The reaction mixture of 3.6 liters (3.1 kg.) put through in one hour separates into 2790 grams of an upper layer with a content of 14.1% by weight methyl isopropenyl ketone, and into 310 grams of a lower layer with a content of 1.95% by weight methyl isopropenyl ketone. The yield of methyl isopropenyl ketone is thus 394 grams in the upper layer, and 6.05 grams in the lower layer. The total yield of methyl isopropenyl ketone therefore amounts to 400.05 grams or 81.8% by weight of the theory, with reference to the amount of formaldehyde put in.

Example 2

The reaction tube described in Example 1 is filled with 560 cc. of cation exchange resin Amberlite IR 112 in the hydrogen ion form. Under the same reaction conditions as set forth in Example 1, 3.6 liters (3.1 kg.) of a mixture of methyl ethyl ketone and 30% aqueous formaldehyde solution in a molar ratio of 8:1 is put through the reactor. After the reaction product is passed out and cooled, it separates into 2940 grams of an upper layer and 68 grams of a lower layer containing 11.7% by weight and 0.59% by weight, respectively, of methyl isopropenyl ketone. Accordingly, the upper layer contains 344 grams, and the lower layer 4 grams of methyl isopropenyl ketone. The total yield, therefore, is 348 grams of methyl isopropenyl ketone or 91.1% by weight of the theory, with reference to the formaldehyde put in.

Example 3

1.8 liters of a mixture of methyl ethyl ketone and 30% aqueous formaldehyde solution in a molar ratio of 3:1 is put through the reaction tube described in Example 1 in accordance with the procedure of that example. After being drained out and cooled, the reaction mixture of 1.8 liters (1.61 kg.) put through in 3.5 hours separates into 4080 grams of an upper layer containing 26.2% by weight methyl isopropenyl ketone and 1524 grams of a lower layer containing 3.1% by weight methyl isopropenyl ketone. The total yield of methyl isopropenyl ketone calculated from those figures amounts to 1115.3 grams or 75.0% by weight of the theory with reference to the formaldehyde put in.

Example 4

In a pressure agitating mechanism equipped with a steam jacket, 1 liter of a mixture of methyl ethyl ketone and 30% aqueous formaldehyde solution in a molar ratio of 6:1, plus 500 cc. of cation exchange resin Lewatit KSN in the hydrogen ion form are heated with intense agitation to 115° C. by means of 2.5-atmosphere steam in the steam jacket. This produces a pressure of 5.5 atmosphere excess pressure. The formation of the methyl isopropenyl ketone is detected on the basis of the hydrogenation number of the reaction mixture. After half an hour, the formaldehyde has reacted almost completely with the methyl ethyl ketone. After the reaction mixture is cooled, the catalyst is separated by filtration, whereupon the filtrate separates into two layers. The upper layer contains 79.0% by weight of the theoretically expected quantity of methyl isopropenyl ketone, with reference to the formaldehyde put in. In the lower, aqueous layer there is an additional 1.5% by weight of the theoretical quantity of methyl isopropenyl ketone, with reference to the formaldehyde put in. The total yield thus amounts to 80.5% by weight of the theory.

Example 5

In a 2-liter pressure agitating mechanism with an agitating system, steam-jacket heating and a built-in filter candle, 1 liter of a mixture of methyl ethyl ketone and 30% aqueous formaldehyde solution in a molar ratio of 8:1, and 560 cc. of cation exchange resin Duolite C 3 in its hydrogen ion form are brought to 115° C. After 20 minutes, the feeding in of 1600 grams per hour of a mixture of methyl ethyl ketone and 30% aqueous formaldehyde solution in a molar ratio of 8:1 is commenced, while at the same time 1600 grams of reaction product per hour are taken out through the filter candle. The reaction product separates into 1571 grams of an upper layer containing 13% by weight of the theory of unreacted formaldehyde, and 81.5% by weight of the theory of methyl isopropenyl ketone, and 29 grams of a lower layer that contains 2% by weight of the theory of unreacted formaldehyde plus 0.2% by weight of the theory of methyl isopropenyl ketone. The overall yield is 81.7% by weight of the theory, with reference to the formaldehyde put in.

Example 6

Instead of the catalyst used in the Example 1, the reaction tube described in Example 1 is filled with 560 cc. of Duolite C 25 in its hydrogen ion form. 3 liters (2.58 kg.) per hour of a mixture of methyl ethyl ketone and 18% aqueous solution of formaldehyde in a molar ratio of 8:1 are passed through the reaction tube at 110° C. After 87.5 min., there is obtained 3770 grams of reaction product which, after leaving the reaction tube and cooling, separates into an upper layer of 3202 grams and a lower layer of 568 grams. The upper layer contains 4.05 moles, or 72.9% by weight of the theory, and the lower layer contains 0.67 mole, or 12.1% by weight of the theory of methyl isopropenyl ketone, based on the formaldehyde used. Thus the total yield of methyl isopropenyl ketone amounts to 85.0% by weight of the theory.

Example 7

In a similar way as described in Example 6, 3.3 kg. per hour of a mixture of methyl ethyl ketone and 37% aqueous solution of formaldehyde in a molar ratio of 8:1 are passed at 110° C. over 560 cc. of Permutit RS in its hydrogen ion form. After 2.5 hours of operation, there is obtained 8260 grams of reaction product which, after leaving the reaction tube and cooling, separates into an upper layer of 7839 grams and a lower layer of 421 grams. The upper layer contains 10.5 moles, or 83.5% by weight, and the lower layer contains 0.176 mole, or 1.4% by weight of the theoretical yield of methyl isopropenyl ketone, based on the formaldehyde used. The total yield amounts to 84.9% by weight of the theory.

What is claimed is:
1. Process for the single-stage production of methyl isopropenyl ketone which comprises contacting methyl ethyl ketone with an aqueous solution of formaldehyde having a concentration of between about 1–50% by weight formaldehyde in a molar ratio of methyl ethyl ketone to formaldehyde between about 1–10:1 in liquid phase in the presence of a strongly acid cation exchange at a temperature between about 50–180° C. and a pressure between about 0.5–20 atmospheres gage resin in acid form, and recovering the methyl isopropenyl ketone-containing reaction mixture.
2. Process according to claim 1, wherein said formaldehyde concentration is between about 25–40% by weight.
3. Process according to claim 1 wherein the methyl isopropenyl ketone is recovered from the reaction mixture.
4. Process according to claim 1 wherein the process is carried out batch-wise.
5. Process according to claim 1 wherein the process is carried out continuously.
6. Process according to claim 1 wherein the process is carried out in a suspension system, using the acid cation exchanger in an amount between about 0.005–1 part by volume per part by volume of liquid phase reactants present.
7. Process according to claim 1 wherein the process is carried out in a fixed bed system, with 0.1 to 20 volumes of the liquid reactants being used per volume of the acid cation exchanger per hour.
8. Process according to claim 1 wherein said temperature is between about 80 and 130° C.
9. Process according to claim 1, wherein said molar ratio is between 6:1 and 8:1.

References Cited

UNITED STATES PATENTS

| 2,288,589 | 7/1942 | Bent et al. | 260—593 |
| 3,037,052 | 5/1962 | Bartnick et al. | 260—593 |
| 2,245,567 | 6/1941 | Brant et al. | 260—593 |

OTHER REFERENCES

Klein et al.: Ind. Eng. Chem. 48, pp. 1278–1286 (1956).

DANIEL D. HORWITZ, *Primary Examiner.*